United States Patent
Reddy et al.

(10) Patent No.: US 10,148,122 B2
(45) Date of Patent: Dec. 4, 2018

(54) SYSTEMS AND METHODS FOR IMPLEMENTING SERIES COMPENSATORS IN STATIC UPS

(71) Applicant: ABB Schweiz AG, Baden (CH)

(72) Inventors: Raghothama Reddy, Murphy, TX (US); Silvio Colombi, Losone (CH); William J. Schmitt, Troy, NY (US); John P. Skliutas, Clifton Park, NY (US)

(73) Assignee: ABB Schweiz AG, Baden (CH)

( * ) Notice: Subject to any disclaimer, the term of this patent is extended or adjusted under 35 U.S.C. 154(b) by 544 days.

(21) Appl. No.: 14/823,154

(22) Filed: Aug. 11, 2015

(65) Prior Publication Data

US 2016/0181864 A1 Jun. 23, 2016

Related U.S. Application Data

(60) Provisional application No. 62/093,084, filed on Dec. 17, 2014.

(51) Int. Cl.
| | |
|---|---|
| *H02J 9/06* | (2006.01) |
| *H02H 9/00* | (2006.01) |
| *H02H 9/02* | (2006.01) |
| *H02J 3/46* | (2006.01) |
| *H02J 7/00* | (2006.01) |

(Continued)

(52) U.S. Cl.
CPC ............... *H02J 9/061* (2013.01); *H02H 9/00* (2013.01); *H02H 9/021* (2013.01); *H02H 9/028* (2013.01); *H02J 3/1807* (2013.01); *H02J 3/46* (2013.01); *H02J 7/0068* (2013.01); *H02J 9/062* (2013.01);

(Continued)

(58) Field of Classification Search
CPC ....................................................... H02J 9/061
See application file for complete search history.

(56) References Cited

U.S. PATENT DOCUMENTS

| | | | | |
|---|---|---|---|---|
| 5,489,838 A | * | 2/1996 | Leowald | H02J 3/1807 323/209 |
| 5,825,162 A | * | 10/1998 | Kida | H02J 3/1807 307/102 |

(Continued)

FOREIGN PATENT DOCUMENTS

| | | |
|---|---|---|
| CN | 103762564 A | 4/2014 |
| CN | 104113060 A | 10/2014 |

(Continued)

OTHER PUBLICATIONS

European Search Report and Written Opinion issued in connection with corresponding EP Application No. 5198263.4 dated Mar. 9, 2016.

(Continued)

*Primary Examiner* — Jared Fureman
*Assistant Examiner* — James Evans
(74) *Attorney, Agent, or Firm* — Barnes & Thornburg LLP

(57) ABSTRACT

A system is provided. The system includes a plurality of uninterruptible power supplies (UPSs), a ring bus, a plurality of chokes, each choke of said plurality of chokes electrically coupled between a respective UPS of said plurality of UPSs and the ring bus, and a plurality of series compensators, each series compensator of the plurality of series compensators electrically coupled between an associated choke of the plurality of chokes and the ring bus.

17 Claims, 2 Drawing Sheets

(51) Int. Cl.
*H02J 3/18* (2006.01)
*G06F 1/26* (2006.01)
*G06F 1/30* (2006.01)
*H02J 3/08* (2006.01)

(52) U.S. Cl.
CPC ............ *G06F 1/26* (2013.01); *G06F 1/30* (2013.01); *H02J 3/08* (2013.01); *Y02E 40/30* (2013.01)

(56) References Cited

U.S. PATENT DOCUMENTS

| | | | |
|---|---|---|---|
| 6,069,779 A | 5/2000 | Glavitsch et al. | |
| 6,191,500 B1 | 2/2001 | Toy | |
| 6,331,765 B1* | 12/2001 | Yamamoto | G05F 1/70 323/210 |
| 6,356,471 B1 | 3/2002 | Fang | |
| 6,362,979 B1* | 3/2002 | Gucyski | H02J 9/062 363/17 |
| 7,345,379 B2 | 3/2008 | Okayama et al. | |
| 7,605,499 B2 | 10/2009 | Skliutas et al. | |
| 7,701,087 B2 | 4/2010 | Eckroad et al. | |
| 7,880,438 B1* | 2/2011 | Cohen | G01R 31/3631 307/66 |
| 7,881,079 B2 | 2/2011 | Prasad et al. | |
| 8,164,221 B2* | 4/2012 | Johansson | H02J 3/1807 307/102 |
| 2003/0062774 A1* | 4/2003 | Escobar | H02J 3/01 307/64 |
| 2014/0368043 A1 | 12/2014 | Colombi et al. | |
| 2014/0375133 A1* | 12/2014 | McCarthy | H02J 9/066 307/68 |

FOREIGN PATENT DOCUMENTS

| | | |
|---|---|---|
| DE | 4422265 A1 | 1/1996 |
| EP | 1006641 A2 | 6/2000 |
| EP | 2 608 355 A2 | 6/2013 |
| GB | 2509742 A | 7/2014 |
| WO | 9827635 A1 | 6/1998 |

OTHER PUBLICATIONS

Haddad et al., "Distribution System Voltage Regulation Under Fault Conditions Using Static Series Regulators", IEEE Industry Applications Society Annual Meeting, Oct. 5-9, 1997, pp. 1383-1389, New Orleans.

Office Action issued in connection with corresponding EP Application No. 15198263.4 dated Apr. 10, 2018.

* cited by examiner

SYSTEMS AND METHODS FOR IMPLEMENTING SERIES COMPENSATORS IN STATIC UPS

CROSS REFERENCE TO RELATED APPLICATIONS

This application is a non-provisional application and claims priority to U.S. Provisional Patent Application Ser. No. 62/093,084 filed Dec. 17, 2014 for "SYSTEMS AND METHODS FOR IMPLEMENTING SERIES COMPENSATORS IN STATIC UPS", which is hereby incorporated by reference in their entirety.

BACKGROUND

The field of the invention relates generally to uninterruptible power supplies, and more particularly, to implementing series compensators in an uninterruptible power supply system.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

BRIEF DESCRIPTION

In one aspect, a system is provided. The system includes a plurality of uninterruptible power supplies (UPSs), a ring bus, a plurality of chokes, each choke of the plurality of chokes electrically coupled between a respective UPS of the plurality of UPSs and the ring bus, and a plurality of series compensators, each series compensator of the plurality of series compensators electrically coupled between an associated choke of the plurality of chokes and the ring bus.

In another aspect, a controller for controlling a power supply system is provided. The power supply system includes a plurality of uninterruptible power supplies (UPSs), a ring bus, a plurality of chokes, and a plurality of series compensators, each choke of the plurality of chokes electrically coupled between a respective UPS of the plurality of UPSs and the ring bus, and each series compensator of the plurality of series compensators electrically coupled between an associated choke of the plurality of chokes and the ring bus and including a capacitor and a bypass switch electrically coupled in parallel with the capacitor. The controller includes a processor, and a memory device communicatively coupled to the processor, the memory device storing executable instructions configured to cause the processor to monitor operation of the capacitor, and control the bypass switch based on the monitored operation.

In yet another aspect, a method of assembling a power supply system that includes a plurality of uninterruptible power supplies (UPSs) and a ring bus is provided. The method includes electrically coupling a choke between each UPS of the plurality of UPSs and the ring bus, and electrically coupling a series compensator between each choke and the ring bus.

DETAILED DESCRIPTION

The systems and methods described address technical challenges related to the use of static UPSs in ring bus architectures. In particular, series compensators are coupled between a ring bus and associated chokes to facilitate improving performance in a ring bus architecture.

Exemplary embodiments of an uninterruptible power supply system are described here. A plurality of uninterruptible power supplies are arranged in a ring bus configuration and configured to supply power to at least one load. At least one control device is communicatively coupled to the plurality of uninterruptible power supplies.

Figure 1:
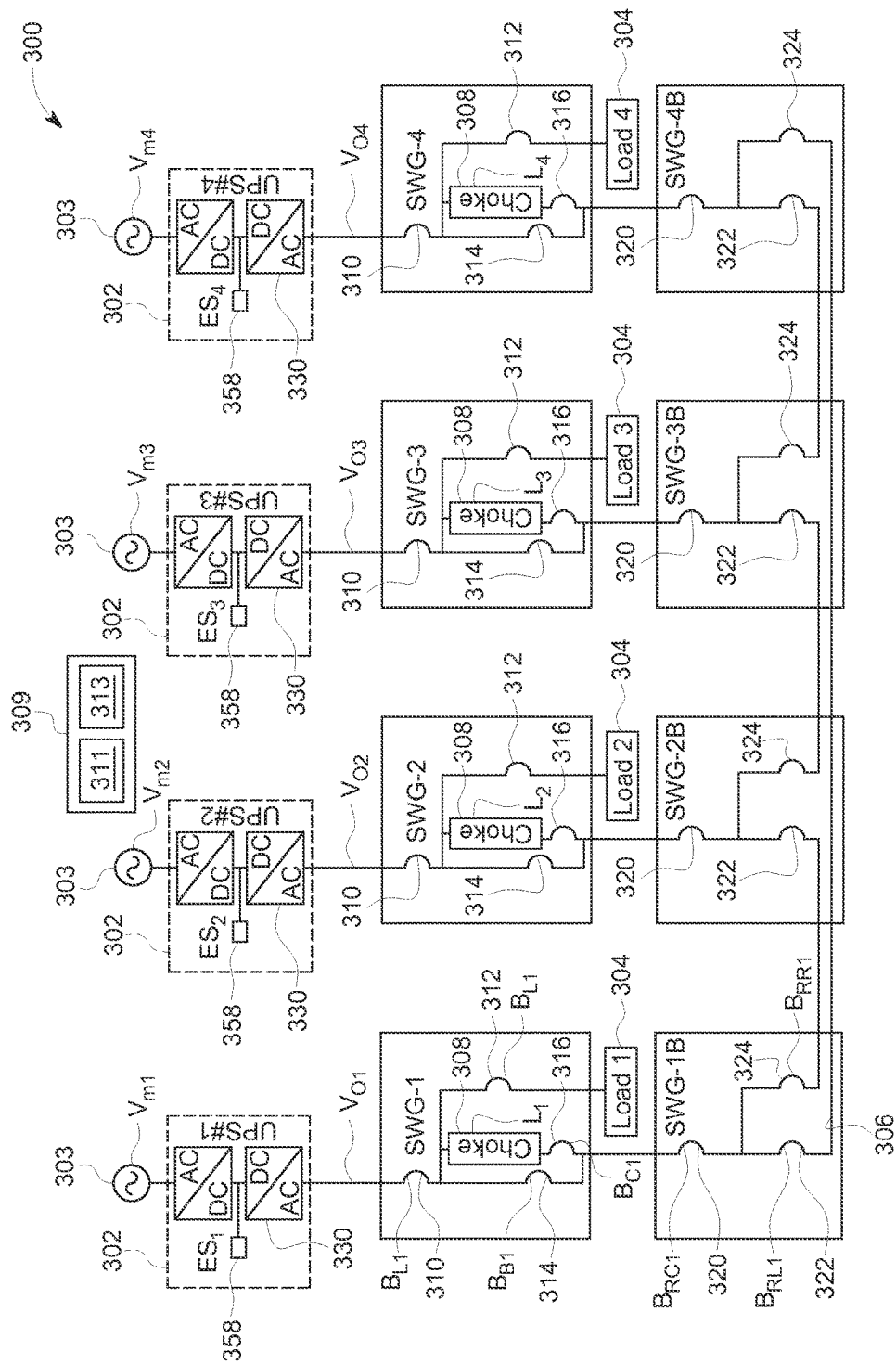
FIG. 1 is a diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide power alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage systems 358 (e.g., batteries, flywheels, etc. with their converter) connected to UPSs 302 to keep power flowing to loads 304, as described herein. Further, if a given UPS 302 fails, loads 304 are fed power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of circuit breakers. Specifically, for each UPS 302, a first circuit breaker 310 is electrically coupled between UPS 302 and choke 308, a second circuit breaker 312 is electrically coupled between first circuit breaker 310 and local load 304, a third circuit breaker 314 is electrically coupled between first circuit breaker 310 and ring bus 306, and a fourth circuit breaker 316 is coupled between choke 308 and ring bus 306. Further, at ring bus 306, a central circuit breaker 320, a left circuit breaker 322, and a right circuit breaker 324 are associated with each UPS 302, and facilitate isolating UPS 302 from ring bus 306 and/or other UPSs 302 on ring bus 306. Each circuit breaker 310, 312, 314, 316, 320, 322, and 324 includes associated logic and relays (neither shown) for operation. The protection scheme provided by circuit breakers 310, 312, 314, 316, 320, 322, and 324 facilitates locating faults in architecture 300 and isolating those faults by opening the appropriate breakers. Further, third circuit breakers 314, also referred to as bypass breakers, facilitate bypassing choke 308 when the associated UPS 302 fails or is under maintenance. This facilitates improving the quality of the voltage on the associated local load 304 as the voltage drop on choke 308 is removed.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Larger chokes 308 have an increased fault current capability. However, if a UPS 302 fails, an associated load 304 is fed by ring bus 306 through an associated choke 308. If choke 308 is relatively large, a large voltage drop across choke 308 occurs. Choke 308 includes a single phase choke in the exemplary embodiment. Alternatively, choke 308 may include any device that enables architecture 300 to function as described herein.

Figure 2:
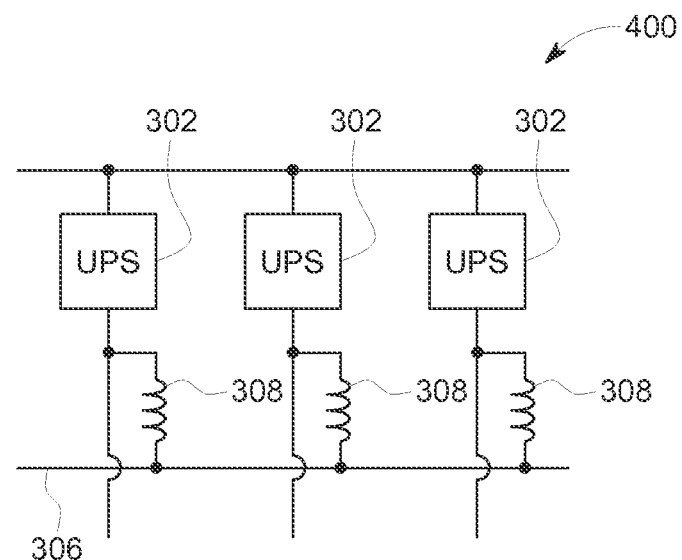
FIG. 2 is a simplified circuit diagram of a connection configuration between UPSs and a ring bus.

FIG. 2 is a simplified circuit diagram of one embodiment of a connection configuration 400 between UPSs 302 and ring bus 306 in architecture 300. As shown in FIG. 2, for each UPS 302, an associated choke 308 is coupled between UPS 302 and ring bus 306.

Figure 3:
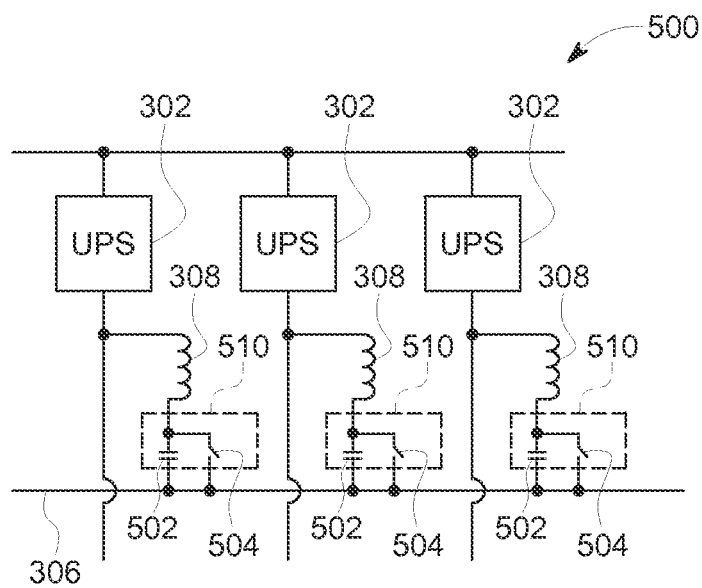
FIG. 3 is a simplified circuit diagram of an alternative connection configuration between UPSs and a ring bus.

FIG. 3 is a simplified circuit diagram of an alternative connection configuration 500 between UPSs 302 and ring bus 306 in architecture 300. As shown in FIG. 3, for each UPS 302, a capacitor 502 and a bypass switch 504 are electrically coupled in parallel with each other, and the combination of capacitor 502 and bypass switch 504 is coupled in series between the associated choke 308 and ring bus 306. Capacitor 502 and bypass switch 504 function as a series compensator 510. Under normal operation, the use of series compensator 510 with a relatively large inductor (i.e., choke 308) allows a complex impedance ($jX_L+(1/j)*X_C$) to be sufficiently low to enhance steady state power transfer from ring bus 306 to loads 304 of UPSs 302.

Series compensator 510 is sized to sufficiently isolate UPS 302 from a faulted ring bus 306 in order to maintain voltage at the associated load 304. First, the inductance value may be determined based on a current rating of UPS 302, an operating voltage, a maximum nominal load power, and acceptable voltage drop at load 304. The net impedance needed for steady state power transfer may be determined next, and may be determined based on operating voltage, a UPS reactive power-voltage characteristic, a minimum number of connected UPSs 302, a maximum nominal load power, and acceptable voltage drop at load 304.

Under a fault of ring bus 306, the voltage across capacitor 502 builds up relatively rapidly. At a predetermined charge level threshold, bypass switch 504 is closed to bypass capacitor 502, allowing choke 308 to limit fault current. For example, a controller, such as controller 309 (shown in FIG. 1), may monitor a charge level on capacitor 502, and close bypass switch 504 when the monitored charge level exceeds the predetermined charge level threshold.

Further, the LC characteristic impedance of choke 308 and capacitor 502 facilitates minimizing a DC portion of the fault current during an asymmetrical fault on ring bus 306. Bypass switches 504 may be, for example, fast electromechanical switches and/or electronic/static switches including thyristors, insulated gate bi-polar transistors (IGBTs), or other devices (e.g., linear motor switches with a closing time of approximately 2 ms). In some embodiments (e.g., in medium voltage applications), bypass switches 504 are voltage dependent devices such as Metal Oxide Varistors (MOVs) and triggered air gaps.

The series compensated current limiting choke of FIG. 3 reduces the steady state inductive impedance while providing current limiting in a fault scenario. Chokes, such as chokes 308, provide the ability to share power in a ring bus system, but also serve as fault current limiters. As described above, a relatively large choke provides fault current isolation, but introduces limitations to normal operation. A series capacitor, such as capacitor 502, compensates the introduced impedance during normal operation, and is capable of being rapidly bypassed by a bypass switch, such as bypass switch 504, during a fault event.

To reduce fault current, the size of choke 308 may be increased until a predetermined level of fault isolation from ring bus 306 is achieved. Choke 308 has an associated impedance of $+j\omega L$, and capacitor 502 in series with choke 308 has an associated impedance of $-j(1/\omega C)$. Accordingly, the net impedance is then $+j\omega L-j(1/\omega C)$. The net impedance is adjusted, assuming $\omega=2\pi*$ (nominal frequency), to a desired impedance for iso-parallel power sharing. This results in an inductive impedance that is a fraction of the inductance of choke 308. This net impedance is the impedance seen during normal operation (i.e., in the absence of a fault).

During fault conditions, capacitor 502 is bypassed to cause the net impedance of choke 308 and capacitor 502 combination to become the full inductance of choke 308, as specified by fault isolation requirements. The fault condition is detected by a voltage rise on capacitor 502 in excess of a normal voltage drop for continuous operation. The detected voltage rise triggers bypass switch 504 to close for the duration of the fault. For example, a controller, such as controller 309 (shown in FIG. 1), may monitor a voltage rise on capacitor 502, and close bypass switch 504 when the monitored voltage rise exceeds a predetermined threshold. Bypass switch 504 may remain closed until it is reset by a protection system (not shown).

Static UPS systems, such as those described herein, may introduce additional challenges in providing an iso-parallel ring bus solution for critical power loads. For example, ring bus 306 can provide a common-mode failure point if the static UPSs 302 are not sufficiently isolated from ring bus 306. Further, static UPSs 302 have a limited fault current that is significantly smaller than that of rotating machines. The result of reaching current limits in any device is a reduction of voltage, which may lead to failure of critical loads. Accordingly, a large iso-parallel choke 308 may be desirable to isolate static UPSs 302 from ring bus 306, substantially preventing reaching the UPSs' current limits.

However, relatively large chokes, which serve to isolate UPSs 302 from ring bus 306, may work against the purpose of ring bus 306. For example, large impedances may impede the ability to deliver power to other UPS locations on the ring. A large inductance also consumes a large amount of reactive power in power transfer, which limits the ability of UPS 302 to effectively regulate voltage. Large inductances, through limited voltage regulation, may limit the size of ring bus 306, because voltage cannot be effectively regulated in power delivery through the ring. Reverse power flow may also be limited through choke 308 in the event that a local UPS 302 fails.

Static UPSs 302 have limitations in providing a fault current, which is relatively close to the normal operating current of UPS 302. For example, in a ring bus configuration, a ring bus fault may overload UPS 302 with a relatively low current. A large fault-isolating impedance may be implemented for static UPS 302, but the large impedance may limit the use of static UPS 302. As described herein, a series-compensated choke 308 allows several advantages over a large choke alone: 1) lower steady state reactive power consumption/losses, 2) higher power utilization without concern for a common-mode failure, 3) ability for greater numbers of UPSs 302 to be connected to ring bus 306, 4) longer possible ring bus length, and 5) greater reliability for singly-fed (single-cord) loads.

Fault current issues may be solved by two different ways: reducing fault current or reducing fault clearing time. If a fault can be cleared faster, the momentary overload of UPS 302 is essentially irrelevant, since the duration of the overload is shorter than that required to interrupt operation of the critical load. Static switching devices may be employed to isolate the fault current faster than a mechanical breaker, which may not operate until after the load has already failed. If the current interruption time can be reduced, choke size may not need to be increased, removing the ancillary problems associated with chokes 308 used for fault current limiting.

As compared to at least some known power systems, the systems and methods described herein utilize series compensators to facilitate improving operation of a static UPS system. The systems and methods described herein are applicable independent of voltage level, and more particularly, are applicable to both low voltage (LV) (e.g., 480V phase-phase) and medium voltage (MV) (e.g., 13.8 kV phase-phase) applications.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a plurality of static uninterruptible power supplies (UPSs);
   a ring bus,
   a plurality of chokes, each choke of said plurality of chokes electrically coupled between a respective static UPS of said plurality of static UPSs and said ring bus; and
   a plurality of series compensators, each series compensator of said plurality of series compensators electrically coupled between an associated choke of said plurality of chokes and said ring bus wherein each series compensator of said plurality of series compensators comprises (i) a capacitor and
   (ii) a bypass switch electrically coupled in parallel with said capacitor, said bypass switch configured to close in response to a fault occurring on said ring bus.

2. A system in accordance with claim 1 wherein the charge level of each respective capacitor of each said series compensator is configured to increase in response to the fault occurring on the ring bus.

3. A system in accordance with claim 2, further comprising a controller configured to:

monitor the charge level on said capacitor of a series compensator of said plurality of series compensators;
determine when the fault has occurred based on the monitored charge level; and
close said bypass switch of the series compensator in response to the occurrence of the fault.

4. A system in accordance with claim 1, wherein said bypass switch comprises a static switch.

5. A system in accordance with claim 4, wherein said static switch comprises at least one of a thyristor and an insulated gate bi-polar transistor.

6. A system in accordance with claim 1, wherein said bypass switch comprises a voltage dependent device.

7. A controller for controlling a power supply system that includes a plurality of static uninterruptible power supplies (UPSs), a ring bus, a plurality of chokes, and a plurality of series compensators, each choke of the plurality of chokes electrically coupled between a respective static UPS of the plurality of static UPSs and the ring bus, and each series compensator of the plurality of series compensators electrically coupled between an associated choke of the plurality of chokes and the ring bus and including a capacitor and a bypass switch electrically coupled in parallel with the capacitor, said controller comprising:
   a processor; and
   a memory device communicatively coupled to said processor, said memory device storing executable instructions configured to cause said processor to:
      determine a charge level of the capacitor included in each series compensator of the plurality of series compensators that is associated with the occurrence of a fault on the ring bus;
      monitor operation and the charge levels of the capacitors;
      determine a fault on the ring bus has occurred based on the charge level of one of the capacitors; and
      control the bypass switch electrically coupled in parallel with the one of the capacitors based on the occurrence of the fault.

8. A controller in accordance with claim 7, wherein to control the bypass switch, said processor is configured to close the bypass switch when the monitored charge level exceeds a predetermined threshold.

9. A controller in accordance with claim 7, wherein to monitor operation of the capacitors, said processor is configured to monitor a voltage rise on the capacitor included in each series compensator of the plurality of series compensators, and wherein to control the bypass switch, said processor is configured to close the bypass switch when the monitored voltage rise of the capacitor electrically coupled in parallel with the bypass switch exceeds a predetermined threshold.

10. A controller in accordance with claim 7, wherein to control the bypass switch, said processor is configured to control a bypass switch that includes a static switch.

11. A controller in accordance with claim 10, wherein to control the bypass switch, said processor is configured to control a bypass switch that includes at least one of a thyristor and an insulated gate bi-polar transistor.

12. A controller in accordance with claim 7, wherein to control the bypass switch, said processor is configured to control a bypass switch that includes a voltage dependent device.

13. A method of protecting a power supply system that includes a plurality of static uninterruptible power supplies (UPSs) and a ring bus from a fault, the method comprising:

electrically coupling a choke between each static UPS of the plurality of static UPSs and the ring bus; and electrically coupling a series compensator that includes (i) a capacitor and (ii) a bypass switch electrically coupled in parallel with the capacitor, the bypass switch configured to close in response to a fault occurring on the ring bus, between each choke and the ring bus.

14. A method in accordance with claim 13, further comprising communicatively coupling a controller to at least one of the series compensators, the controller configured to (i) determine the occurrence of the fault on the ring bus and (ii) close at least one of the bypass switches in response to the determination that the fault has occurred on the ring bus.

15. A method in accordance with claim 13, wherein electrically coupling a series compensator comprises electrically coupling a series compensator that includes a bypass switch including a static switch.

16. A method in accordance with claim 13, wherein electrically coupling a series compensator comprises electrically coupling a series compensator that includes a bypass switch including a static switch having at least one of a thyristor and an insulated gate bi-polar transistor.

17. A method in accordance with claim 13, wherein electrically coupling a series compensator comprises electrically coupling a series compensator that includes a bypass switch including a voltage dependent device.

* * * * *